Jan. 9, 1951     I. H. PAGE ET AL     2,537,081
CATHODE-RAY INDICATOR
Filed Dec. 13, 1945
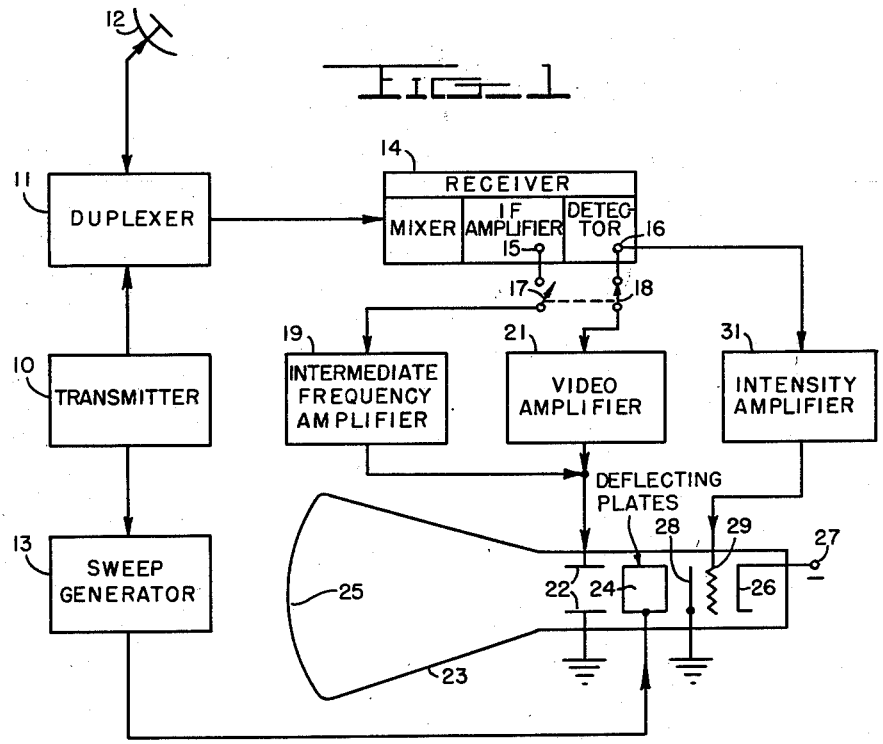
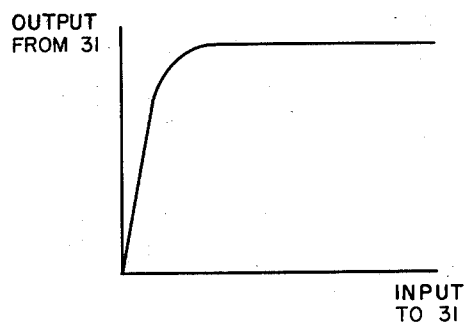
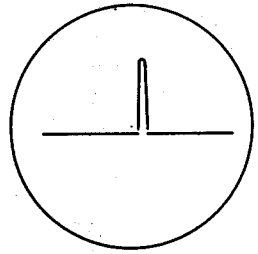
Inventors
ROBERT M. PAGE
IRVING H. PAGE
By M. O. Hayes
Attorney Patented Jan. 9, 1951

2,537,081

UNITED STATES PATENT OFFICE 2,537,081

CATHODE-RAY INDICATOR

Irving H. Page and Robert M. Page,
Washington, D. C.

Application December 13, 1945, Serial No. 634,879

8 Claims. (Cl. 343—13)

(Granted under the act of March 3, 1883, as amended April 30, 1928; 370 O. G. 757)

This invention relates in general to radio echo ranging and direction finding systems and, more particularly, to a cathode ray indicator device of the type associated with such a system for providing a visual indication of an applied signal voltage by deflection of a time base line. More specifically, such a cathode ray indicator may be employed to provide an indication of any D. C. pulse or A. C. signal which is frequently recurring or periodic in nature. As will become clear from the description which follows hereinafter, the invention is shown and described in connection with a radio echo ranging system to measure the time interval between the transmitted pulse and the received target echo pulse.

Radio echo ranging and direction finding systems commonly include a radio pulse transmitter which produces very short pulses of radio frequency energy at a repetition rate of up to several thousand times per second, directional antenna means for transmission of such pulses and for reception of those of such pulses as are reflected back from a target, receiver means to detect the reflected pulses, and a cathode ray indicator for presenting information as to the elapsed time between the production of the transmitted pulse and reception of the reflected echo pulse.

One type of cathode ray indicator employed for this purpose has a time base line produced by applying a sawtooth wave voltage to one set of deflecting plates of the cathode ray tube. On this time base line is imposed a deflection pip produced by applying the received target echo pulse to the other set of deflecting plates. The sawtooth wave voltage sweeps the electron beam across the screen of the tube at a rate equal to the repetition rate of the transmitter. The intensity of illumination of the time base trace on the fluorescent screen is adjusted by varying the voltage on the intensity grid of the cathode ray tube until the density of the electron beam striking the screen is such that for the velocity at which the beam moves across the screen the trace exhibits the desired illumination.

It will be seen, however, that when the electron beam is deflected to produce an echo pip, the velocity at which the beam moves to trace out the pip is automatically greater than the abovementioned velocity with which the time base line is traced out. This of course reduces the intensity of illumination of the echo pip. If the deflection is a large one, the velocity will be very much increased and the intensity of illumination of echo pip will be very much decreased.

This decrease in the intensity of illumination of the echo pip renders it difficult or impossible to distinguish the dim echo pip against the bright time base line and bright indication of electrical noise. This produces considerable eyestrain on the part of the observer, as well as uncertainty as to the information indicated.

This uncertaintly is even more critical, of course, in an application in which a periodic high frequency A. C. signal having an irregular waveform is indicated by deflection of the electron beam. In such a case small irregularities in the waveform of the signal may be made wholly invisible because of the effect just described.

Accordingly, it is one object of this invention to provide a cathode ray indicator, employing deflection of a time base line as the method of indication, in which there is no decrease in illumination of the trace when it is deflected.

It is another object of this invention to provide a cathode ray indicator, of the type described, in which the time base line and indications of electrical noise may be reduced in intensity with respect to the deflected trace.

It is another object of this invention to provide a cathode ray indicator, of the type described in which the time base line and indications of electrical noise may be removed from the cathode ray tube screen altogether while the deflected trace remains visible thereon.

In accordance with the present invention, a cathode ray indicator tube is provided having means for varying the intensity of the electron beam, such as an intensity grid, and means for deflecting the time base line in proportion to an applied signal. The signal to be indicated is applied through one channel to the deflecting means of the cathode ray indicator, and also through an amplifier having high gain and a low limit level to the beam intensity varying means so as to increase the intensity of illumination of the deflected trace to a fixed high level.

The invention will be further described by reference to the accompanying drawing, in which:

Figure 1 is a diagrammatic representation of one embodiment of the invention;

Figure 2 is a graph of the output voltage against the input voltage of a high gain, low limit amplifier such as is employed in the embodiment of Figure 1; and Figure 3 shows the type of indication produced on the screen of the cathode ray indicator of this invention.

Referring now to Figure 1, transmitter 10 produces short pulses of radio frequency energy which are fed through duplexer 11 to directional antenna 12. Synchronously with each such pulse of radio frequency energy a voltage impulse is applied from transmitter 10 to sweep generator 13 to trip the sweep generator. In the embodiment shown, sweep generator 13 produces a sawtooth wave voltage output.

Those pulses which are reflected back from a target and received by directional antenna 12 are applied to receiver 14, which comprises a mixer stage, an intermediate frequency amplifier stage, and a detector stage, as shown. The modulated intermediate frequency signal may be taken off at output terminal 15, or the detected modulation envelope voltage may be taken off at output terminal 16, as desired. Switches 17 and 18 are arranged so that when one is open the other is closed. When switch 17 is closed, the intermediate frequency signal from receiver 14 is applied to intermediate frequency amplifier 19, and when switch 18 is closed the detected modulation envelope voltage from receiver 14 is applied to video amplifier 21.

The output voltages from amplifiers 19 and 21 are applied to vertical deflecting plates 22 of cathode ray tube 23. To horizontal deflecting plates 24 is applied the above described sawtooth wave voltage output from sweep generator 13. As was stated above, sweep generator 13 is tripped by a voltage impulse from transmitter 10 in synchronism with the production of the transmitted pulse. Thus, the signal from amplifier 19 when switch 17 is closed, or from amplifier 21 when switch 18 is closed, will be traced out on fluorescent screen 25 of the cathode ray tube.

The elements of cathode ray tube 23 are shown in simplified form in Figure 1. Electron gun 26 is returned to negative potential source 27, and anode 28 is returned to ground. Intensity grid 29 is fed by intensity amplifier 31.

The detected modulation envelope of the received signal which appears at terminal 16 is impressed upon intensity amplifier 31. This amplifier provides high gain amplification with the final output positive and limited to a low voltage level. Amplifier 31 may be, for example, a limiting amplifier of a type commonly employed in the intermediate frequency stage of frequency modulation receivers, having in its output circuit a pentode electron tube with a low plate voltage applied thereto.

As will be seen, the positive output of intensity amplifier 31 will be applied to intensity grid 29 synchronously with the deflection of the electron beam trace which is caused by application of a signal voltage to deflecting plates 22. This results in increasing the intensity of the electron beam which strikes screen 25, and renders the trace of the echo pip more luminous than it would be without such increase in beam intensity. The increase in luminosity depends, of course, on the value of the voltage output of amplifier 31 and the velocity with which the beam trace is deflected. The echo pip trace may only increase in intensity enough to be easily visible in comparison to the time base trace. Or, if desired, the voltage on the intensity grid when no deflection is present may be made negative enough that no trace is present on screen 25 except when deflection occurs; in other words, no time base line will appear on the cathode ray tube screen, but only the deflection traces.

Figure 2 is a graph showing the amplification characteristic which may be exhibited by intensity amplifier 31. As is indicated, the output voltage of amplifier 31 increases in magnitude rapidly as the input first increases from zero, and is severely limited to a constant value after a certain point.

As the input of amplifier 31 first increases from zero, it may be that the amplified output voltage is at first not of sufficient magnitude to counteract the increased velocity of the beam as it traces out the deflection pip, so that that part of the deflected trace which is nearest to the time base line may not be visible. Figure 3 illustrates this condition. As shown there, if this condition is present, it will affect only a small portion of the deflection pip.

It will be understood that the embodiment shown and described in this specification is exemplary only, and that the scope of the invention will be ascertained with reference to the appended claims.

The invention described herein may be manufactured and used by or for the Government of the United States of America for governmental purposes without the payment of any royalty thereon or therefor.

What is claimed is:

1. A cathode ray indicator for presenting information as to the time interval between a pair of voltage impulses which recur always separated by substantially the same time interval, comprising a cathode ray tube including means for generating an electron beam and means for varying the intensity of the electron beam; electron beam deflecting time base generator means responsive to the first of said pair of impulses; means responsive to the second of said pair of impulses to deflect the electron beam from the time base; and means for applying the second of said pair of impulses to said beam intensity varying means of said tube.

2. A cathode ray indicator for presenting information as to the time interval between a pair of voltage impulses which recur always separated by substantially the same time interval, comprising a cathode ray tube including means for generating an electron beam, means for varying the intensity of the electron beam, and a screen; sawtooth voltage generator means responsive to the first of said pair of voltage impulses; control means for said cathode ray tube responsive to said sawtooth voltage to sweep the electron beam across the cathode ray tube screen; means responsive to the second of said pair of impulses to deflect the electron beam; and mean applying the second of said pair of impulses to said beam intensity varying means of said tube.

3. A cathode ray indicator for presenting information as to the time interval between a pair of voltage impulses which recur always separated by substantially the same time interval, comprising a cathode ray tube including means for generating an electron beam, means for varying the intensity of the electron beam, and a screen; sawtooth voltage generator means responsive to the first of said pair of voltage impulses; control means for said cathode ray tube responsive to said sawtooth voltage to sweep the electron beam across the cathode ray tube screen; means responsive to the second of said pair of impulses to deflect the electron beam; and means applying the second of said pair of impulses to said beam intensity varying means of said tube to increase the intensity of the electron beam to a fixed high level value synchronously with the deflection of the electron beam.

4. A radio pulse system comprising pulse signal transmitter means, pulse signal receiver means, directional antenna means connectable alternately to said transmitter means and said receiver means, said receiver means including means operative to produce a voltage impulse upon reception of a pulse signal, a cathode ray tube including electron beam generating means, electron beam intensity varying means and a plurality of electron beam deflecting means, time base voltage generator means operable in synchronism with said transmitter means, means applying the time base voltage from said generator means to one of said deflecting means to produce a time base trace of said beam, means applying said voltage impulse to another of said deflecting means to deflect said beam from said time base trace and means applying said voltage impulse to said electron beam intensity varying means.

5. A radio echo system comprising pulse signal transmitter means, pulse signal receiver means, directional antenna means connectable alternately to said transmitter means and said receiver means, said receiver means including means operative to produce a voltage impulse upon reception of a signal pulse, a cathode ray tube including electron beam generating means, electron beam intensity varying means, two pairs of electron beam deflecting means and a screen, sawtooth voltage generating means operable in synchronism with said transmitter means, means applying the output of said sawtooth voltage generating means to one pair of said deflecting means to sweep said beam in a certain direction across said screen beginning at the instant said transmitter means produces a signal pulse and means synchronously applying said voltage pulse produced by said receiver means to the other pair of said deflecting means and to said beam intensity varying means.

6. A radio echo system comprising pulse signal transmitter means, pulse signal receiver means, directional antenna means connectable alternately to said transmitter means and said receiver means, said receiver means including means operative to produce a voltage impulse upon reception of a pulse signal, a cathode ray tube including electron beam generating means, electron beam intensity varying means, two pairs of electron beam deflecting means and a screen, sawtooth voltage generating means operable in synchronism with said transmitter means, means applying the output of said sawtooth voltage generating means to one pair of said deflecting means to sweep said beam in a certain direction across said screen beginning at the instant said transmitter means produces a pulse signal, means applying said voltage impulse to the other pair of said deflecting means to deflect said beam from said sweep and means applying said voltage impulse to said beam intensity varying means to increase the intensity of said beam to a predetermined high level value during deflection thereof from said sweep.

7. A device for indicating the time of occurrence of a recurrent signal voltage comprising a cathode ray tube including electron beam producing means and electron beam intensity varying means, means producing a voltage pulse initiating recurrence of said signal voltage, electron beam deflecting time base generating means controlled by said voltage pulse, means responsive to said signal voltage to deflect said beam from said time base and means applying said signal voltage to said electron beam intensity varying means.

8. A device for indicating the time of occurrence of a recurrent signal voltage comprising a cathode ray tube including electron beam producing means and electron beam intensity varying means, means producing a voltage pulse initiating recurrence of said signal voltage, electron beam deflecting time base generating means controlled by said voltage pulse, means responsive to said signal voltage to deflect said beam from said time base, means amplifying said signal voltage and means applying said amplified signal voltage to said electron beam intensity varying means.

IRVING H. PAGE.
ROBERT M. PAGE.

REFERENCES CITED

The following references are of record in the file of this patent:

UNITED STATES PATENTS

| Number | Name | Date |
|---|---|---|
| 2,313,967 | Read, Jr. | Mar. 16, 1943 |
| 2,399,955 | Theisen | May 7, 1946 |
| 2,405,930 | Goldberg | Aug. 13, 1946 |
| 2,407,898 | Norgaard | Sept. 17, 1946 |
| 2,411,963 | George | Dec. 3, 1946 |
| 2,412,702 | Wolff | Dec. 17, 1946 |
| 2,415,566 | Rhea | Feb. 11, 1947 |
| 2,416,088 | Deerhake | Feb. 18, 1947 |
| 2,416,089 | Jones | Feb. 18, 1947 |
| 2,423,023 | Hershberger | June 24, 1947 |
| 2,423,104 | Labin | July 1, 1947 |

FOREIGN PATENTS

| Number | Country | Date |
|---|---|---|
| 520,778 | Great Britain | May 3, 1940 |